July 21, 1964 | G. R. HENDERSON | 3,142,047

MEMORY PLANE

Filed Dec. 14, 1960 | 10 Sheets-Sheet 1

INVENTOR.
George R. Henderson

BY Wilfred G. Caldwell

Attorney

July 21, 1964 G. R. HENDERSON 3,142,047

MEMORY PLANE

Filed Dec. 14, 1960 10 Sheets-Sheet 2

INVENTOR.
George R. Henderson

BY Wilfred G. Caldwell

Attorney

INVENTOR.
George R. Henderson
BY Wilfred G. Caldwell
Attorney

INVENTOR.
George R. Henderson
BY Wilfred G. Caldwell
Attorney

July 21, 1964 G. R. HENDERSON 3,142,047

MEMORY PLANE

Filed Dec. 14, 1960 10 Sheets-Sheet 5

INVENTOR.
George R. Henderson

BY Wilfred G. Caldwell

Attorney

INVENTOR.
George R. Henderson
BY Wilfred G. Caldwell
Attorney

July 21, 1964 G. R. HENDERSON 3,142,047

MEMORY PLANE

Filed Dec. 14, 1960 10 Sheets-Sheet 7

INVENTOR.
George R. Henderson

BY Wilfred G. Caldwell

Attorney

INVENTOR.
George R. Henderson
BY Wilfred G. Caldwell
Attorney

July 21, 1964 G. R. HENDERSON 3,142,047

MEMORY PLANE

Filed Dec. 14, 1960 10 Sheets-Sheet 9

INVENTOR.
George R. Henderson
BY Wilfred G. Caldwell
Attorney

INVENTOR.
George R. Henderson

BY Wilfred G. Caldwell

Attorney

United States Patent Office 3,142,047
Patented July 21, 1964

3,142,047
MEMORY PLANE

George R. Henderson, Byfield, Mass., assignor to Columbia Broadcasting Systems, Inc., Newburyport, Mass., a corporation of New York
Filed Dec. 14, 1960, Ser. No. 75,846
9 Claims. (Cl. 340—174)

This invention relates generally to electronic computer components having storage capabilities, and in particular to bistable magnetic remanence devices finding application both as logic elements and memory units, and to a method of manufacturing such devices.

Magnetic core structure including a ring of material having bistable magnetic remanence characteristics surrounding an electrical conductor are useful in various electronic computer applications, such as logic elements designed to retain the last bit written into them and memory units for storage of large quantities of information. Various problems have arisen, however, in designing and manufacturing workable structures of the type described, particularly in the case of memory units.

Since information is stored in magnetic core memory devices with a density of one bit per core, it will readily be appreciated that modern electronic computers of even modest size and capability require large number of such cores to provide adequate memory capacity. Moreover, the many cores must be organized with respect to an intricate network of conductors such as $x$-drive, $y$-drive, and perhaps sensing, inhibiting, and biasing conductors. A further requirement is that the network of conductors and cores take as little space as possible.

The solution heretofore generally practiced has been the stringing of numerous tiny cores of ferrite material on the various conductor wires in an intricate band weave pattern, the various conductors criss-crossing in a complicated network and the ferrite cores being located at the intersections of these conductors. The weaving of a memory plane of this nature is a cumbersome, time-consuming, expensive process ill suited to mass production techniques. In addition, the ferrite cores, though they are quite small and therefore difficult to handle, nevertheless constitute bulk magnetic material which cannot be switched from one remanence polarity to another as fast as a thin film of magnetic material. These cores, moreover, are fairly fragile.

For these reasons there has been a continuing attempt to develop memory planes which can be fabricated by means of the various printed circuit techniques which have been applied so successfully to the mass production and miniaturization of a wide variety of electronic equipment. Such efforts have heretofore been largely unsuccessful, however. Planar patches of magnetic alloy film, for example, have been plated on a substrate and conductors have then been placed across the alloy. This arrangement, however, lacks a closed loop of magnetic alloy linking with the current path, and consequently the read output signal voltage induced by the switching of such an open loop is fairly low, necessitating the use of clumsy magnetic shielding enclosures to prevent this signal from being masked by background pickup.

Attempts to close the loop by plating a second layer of magnetic alloy over the first and contacting the edges thereof have been unsatisfactory owing to the variable and generally poor quality of the junctions formed at the edges of the alloy layers. Gaps are inevitably left when the two halves of the loop are not plated simultaneously, and the size of these gaps is not repeatable.

It is broadly an object of the present invention to solve one or more of the foregoing problems, and in particular to provide a satisfactory printed circuit memory plane and a method of manufacturing the same which contemplates the fabrication of an integral closed loop of thin film magnetic material in a single printed circuit operation. Such a method avoids the problem of making good, repeatable junctions, permits a significant reduction in the thickness of the magnetic material employed, enables the attainment of larger output signals, increases the speed of switching, reduces or eliminates the shielding requirements, and realizes the advantages of miniaturization and ease of production accruing from the use of printed circuit techniques.

In accordance with an illustrative embodiment demonstrating these and other objects and advantages of the invention, there is provided a magnetic remanence device comprising a mounting member, an electrically conductive coating over the mounting member arranged to define a current path therealong, and a magnetic coating extending circumferentially about the mounting member and surrounding the current path for electro-magnetic linking therewith.

In accordance with method aspects of the invention there is provided a method of manufacturing a magnetic remanence device comprising the steps of applying an electrically conductive coating over a mounting member in a manner to define a current path extending therealong and applying a magnetic coating circumferentially about the mounting member and the current path thus providing for electromagnetic linking therewith.

The foregoing brief summary, as well as additional features of the invention, may best be appreciated by reference to the following detailed description of an illustrative embodiment and method in accordance therewith when read in conjunction with the accompanying drawings. The latter include a series of partly diagrammatic perspective views illustrating successive steps in the manufacture of a memory plane in accordance with the invention and showing the latter at the corresponding stages of the manufacturing process.

Figures 1, 2, 3:
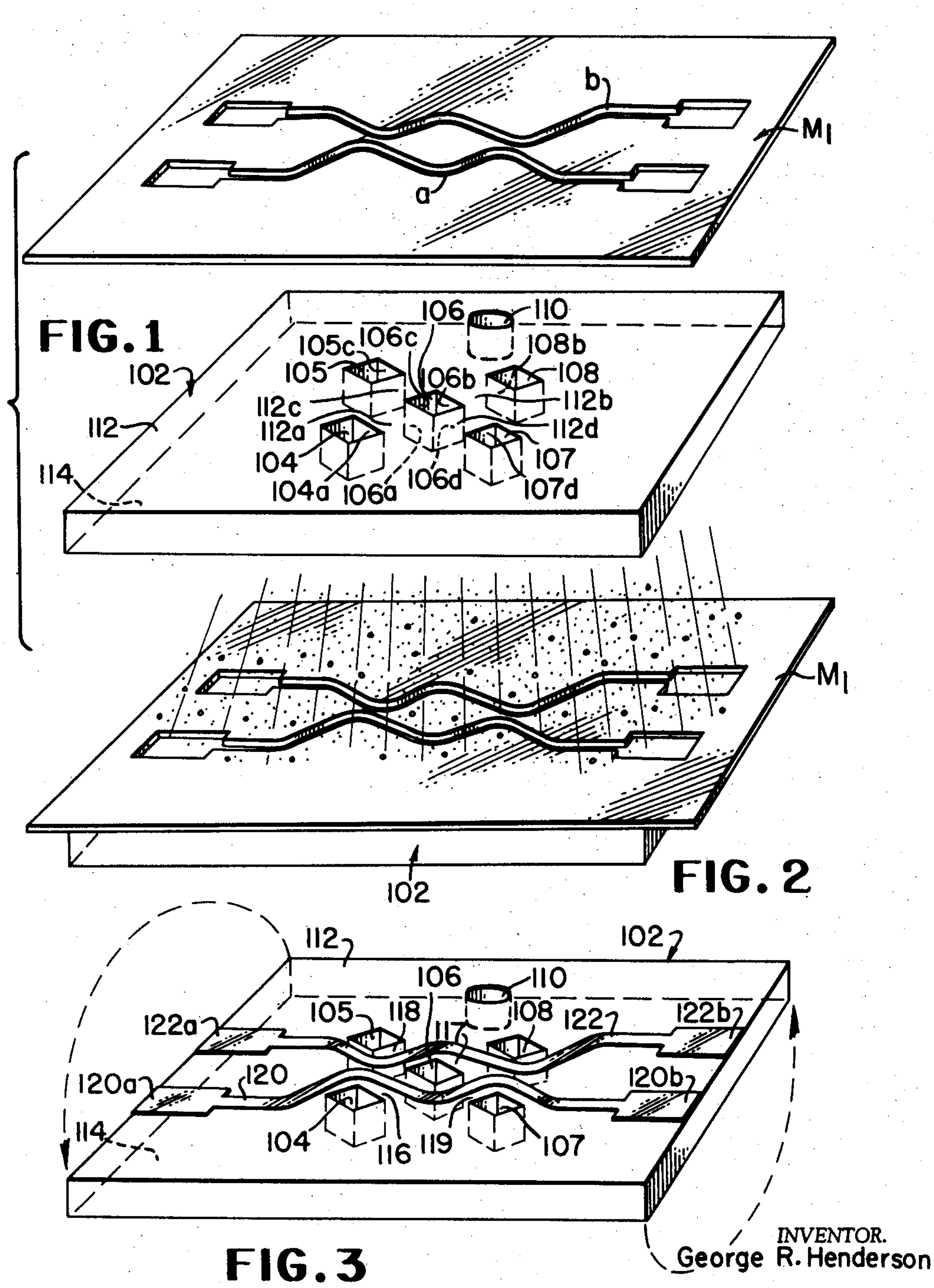
FIG. 1 is an exploded view of the assembly of a sheet of electrically insulating substrate material to be used in the manufacture of a relatively simple memory plane in accordance with this invention and a mask used for vapor-deposition of metallic material to form a first coordinate set of drive conductors on one face thereof.
FIG. 2 shows the aforesaid substrate sheet and mask in asesmbled relationship while being exposed to metallic vapor for plating of first coordinate set of drive conductors.
FIG. 3 shows the substrate sheet and the finished vapor-plated first coordinate set of drive conductors.
Figures 1A, 2A:
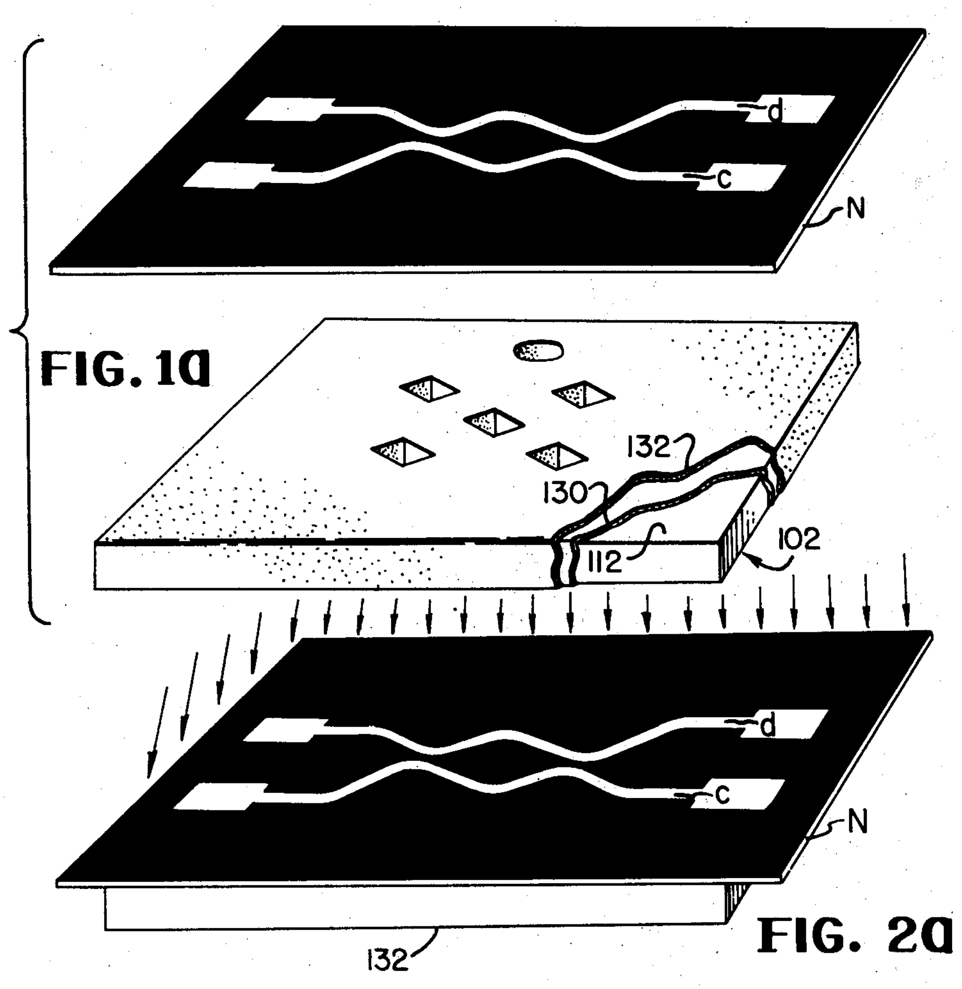
Figure 2B:
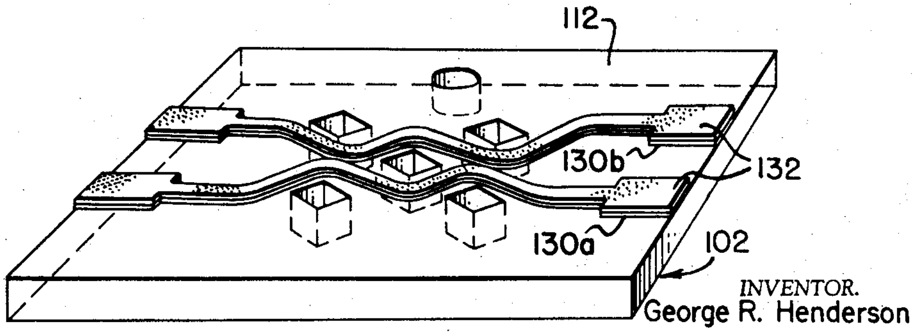
Figure 2C:
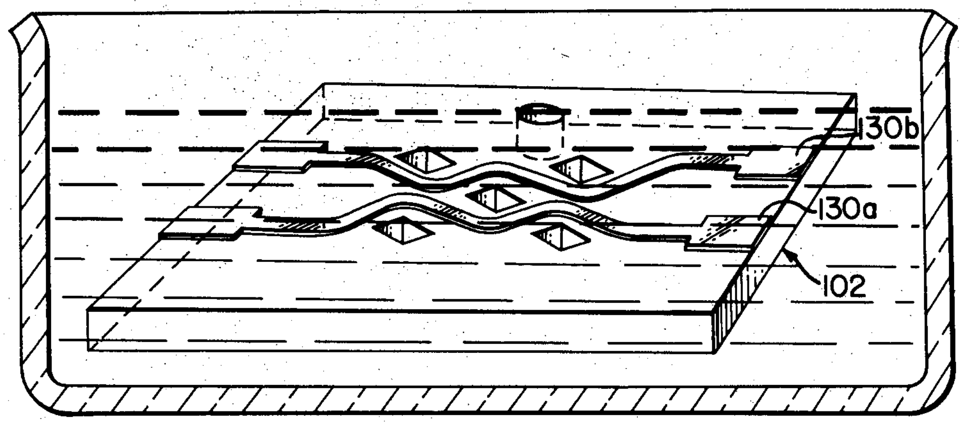
Figure 4:
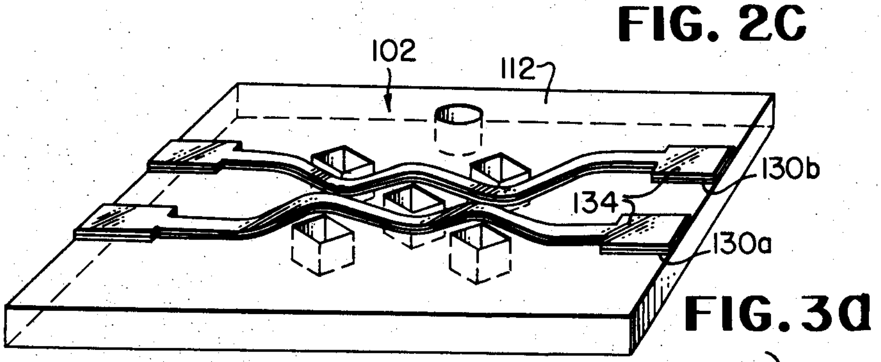
Figure 4:
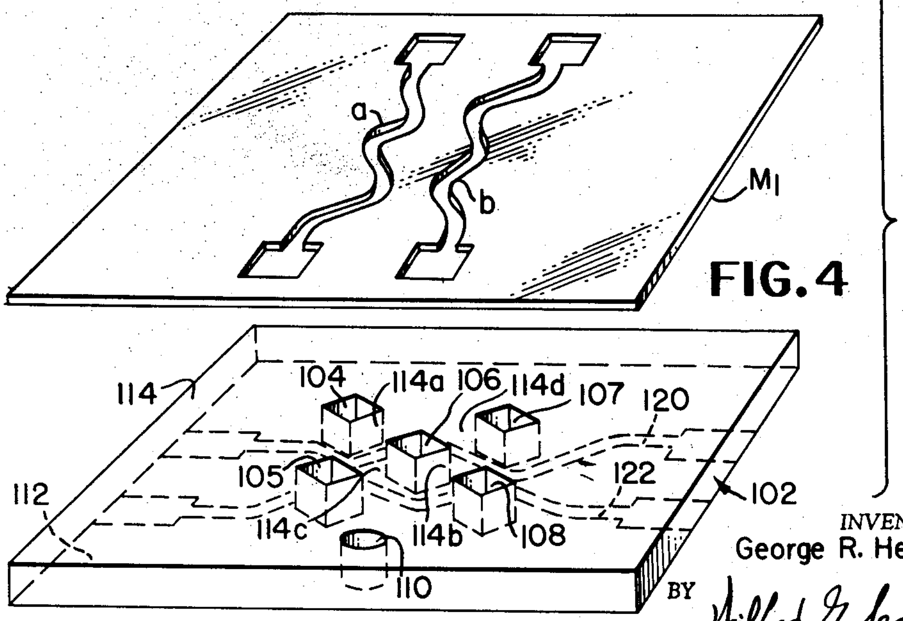
Figure 5:
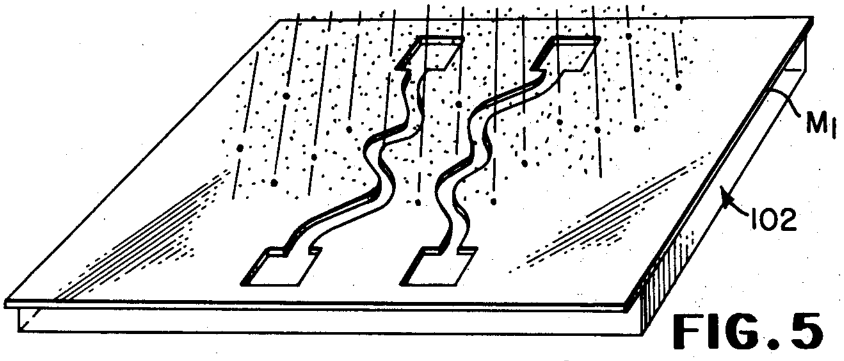
Figure 6:
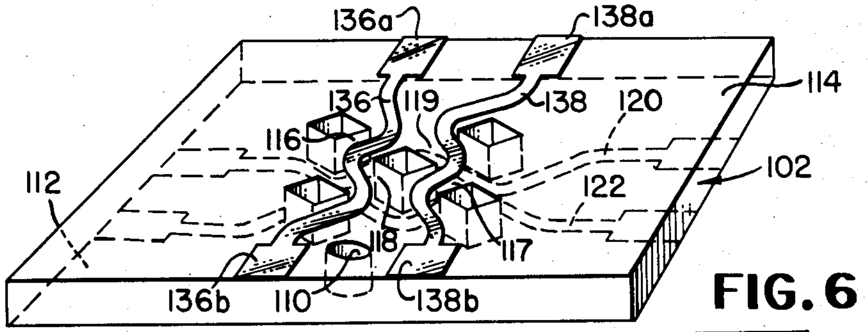
Figure 7:
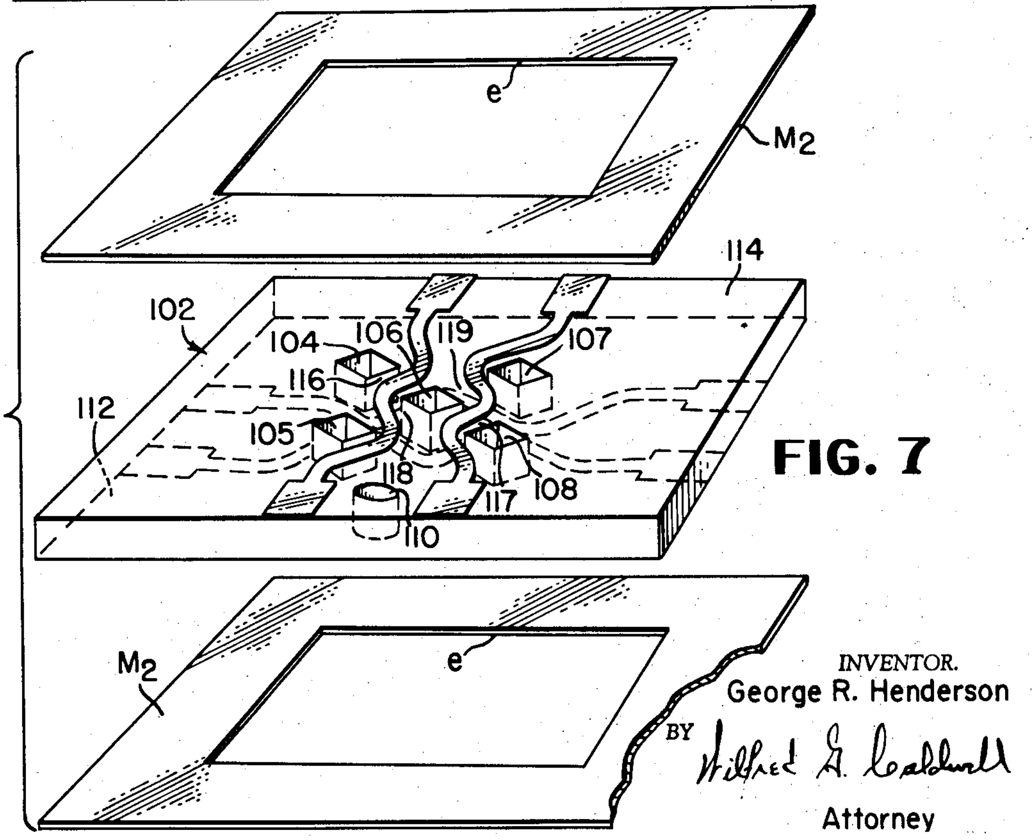
Figure 8:
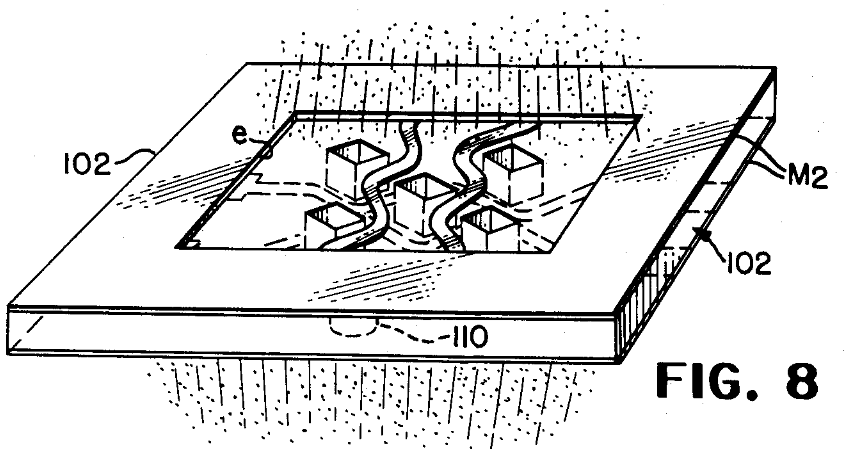
Figure 9:
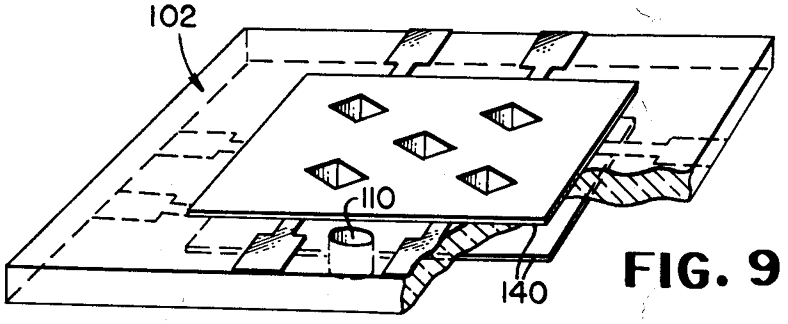
Figure 10:
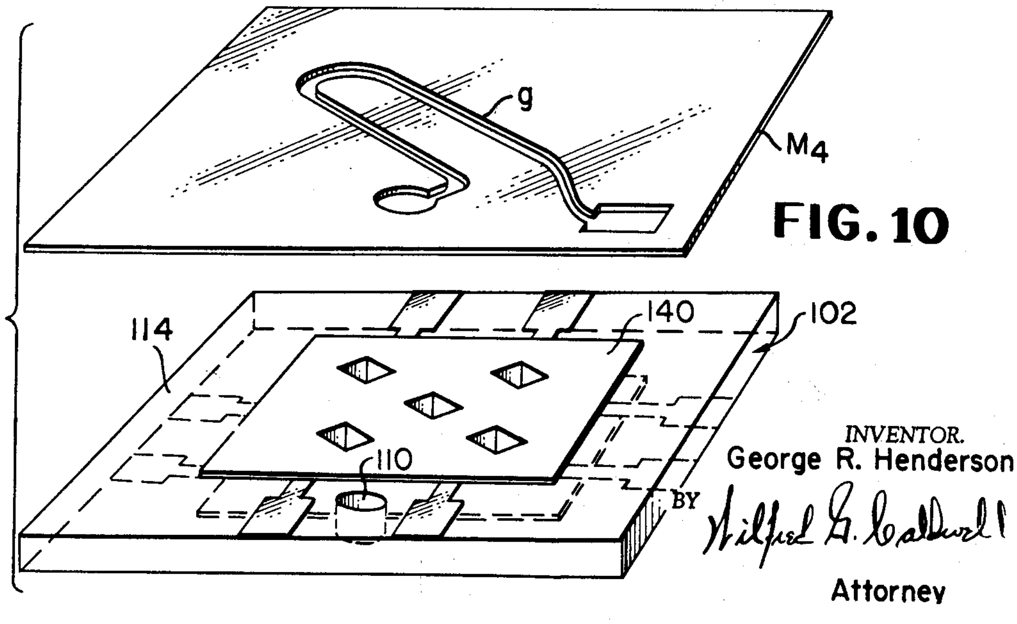
Figure 9A:
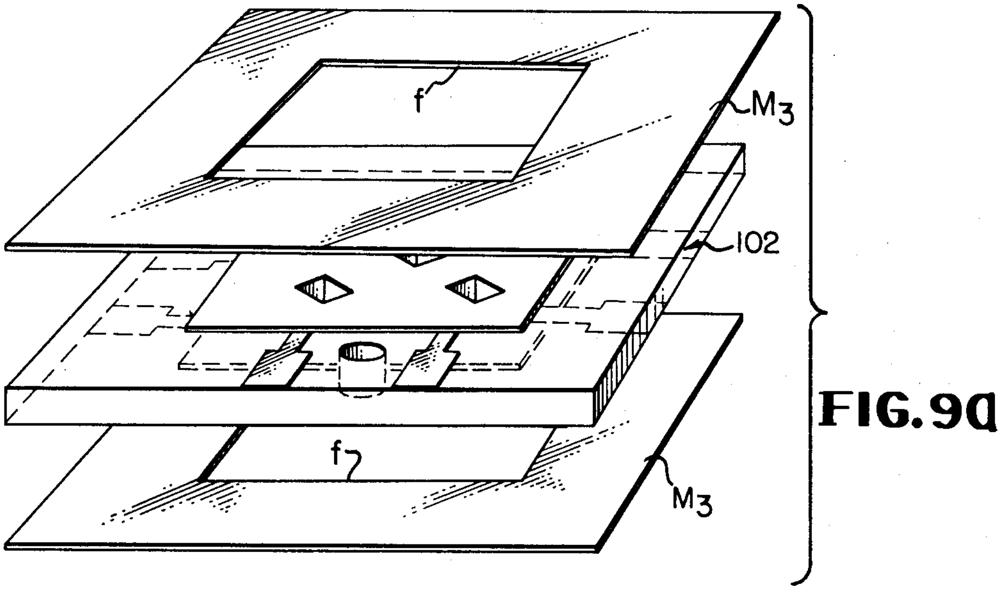
Figures 9B, 9C, 9D:
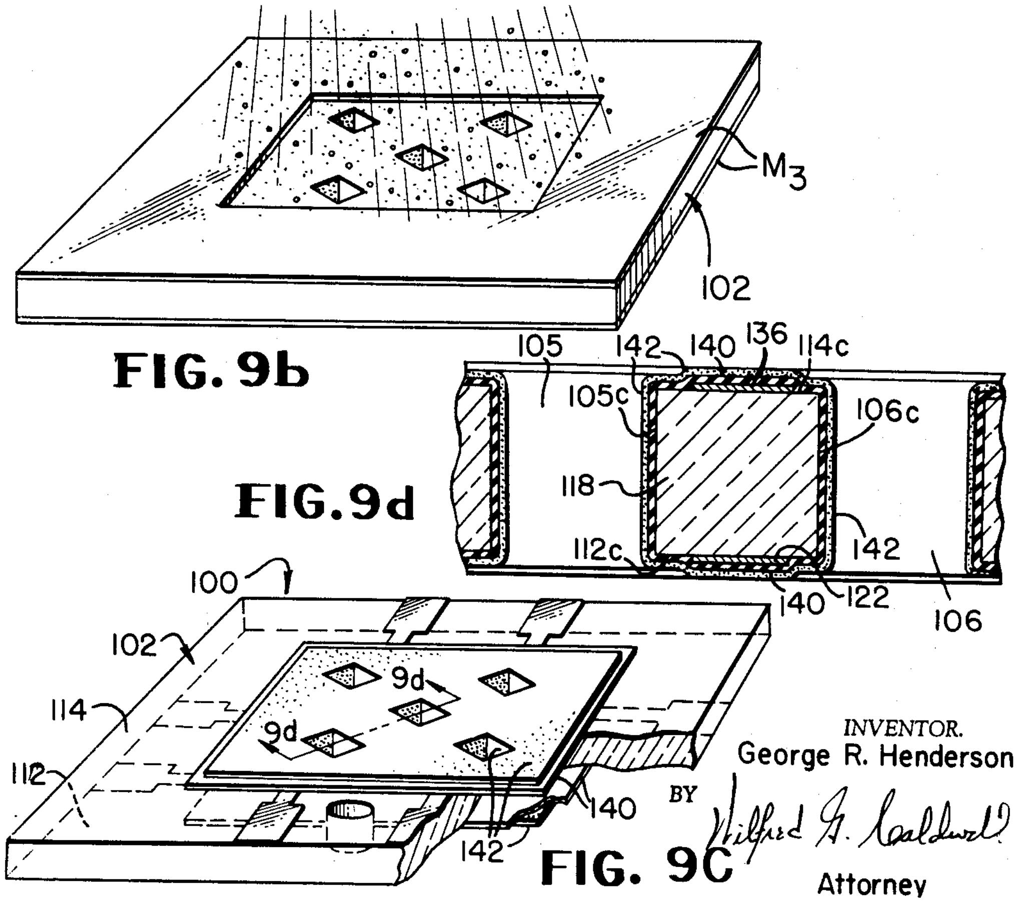
Figures 11, 12:
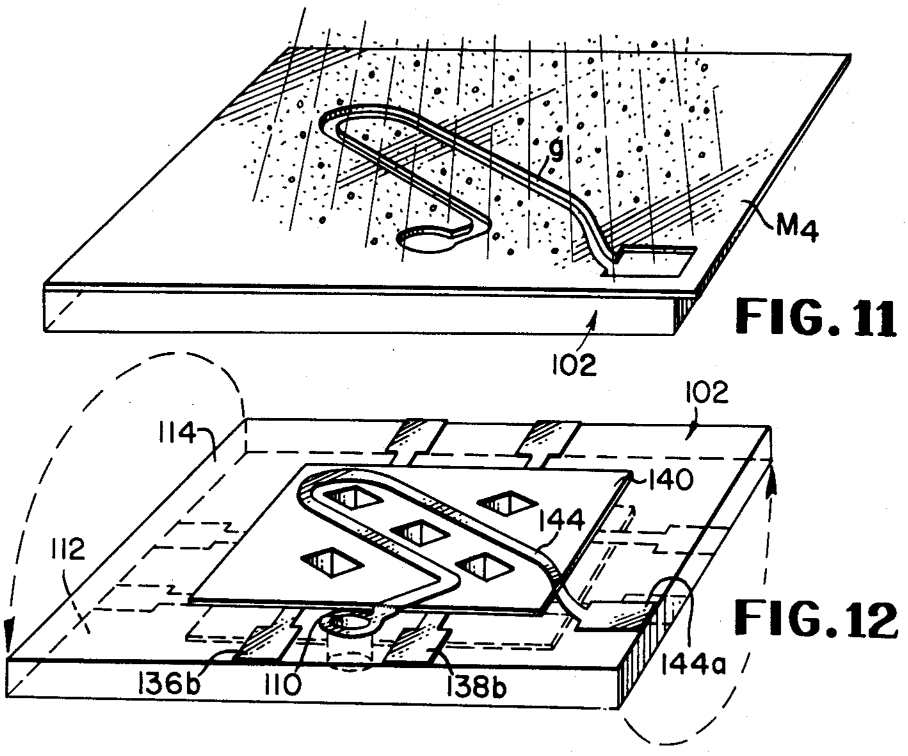
Figure 13:
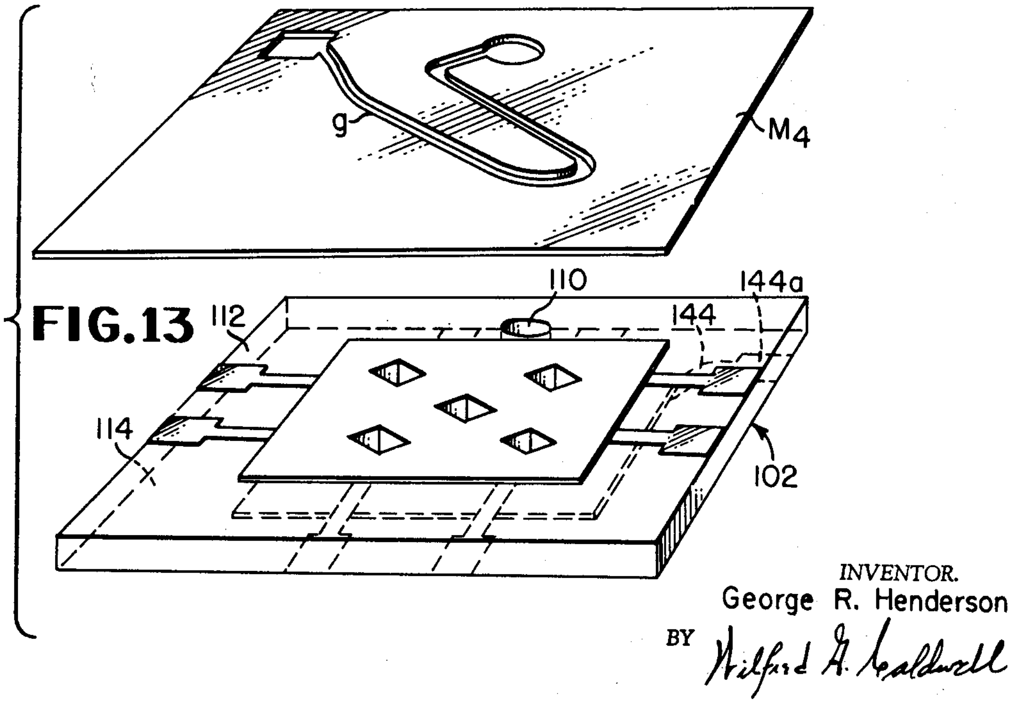
Figures 14, 15:
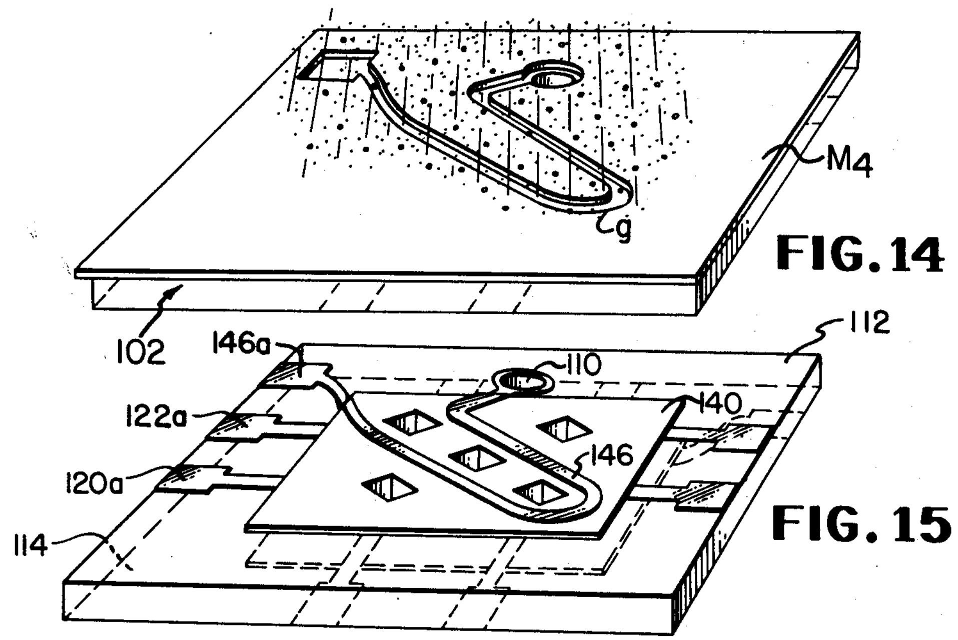
Figure 16:
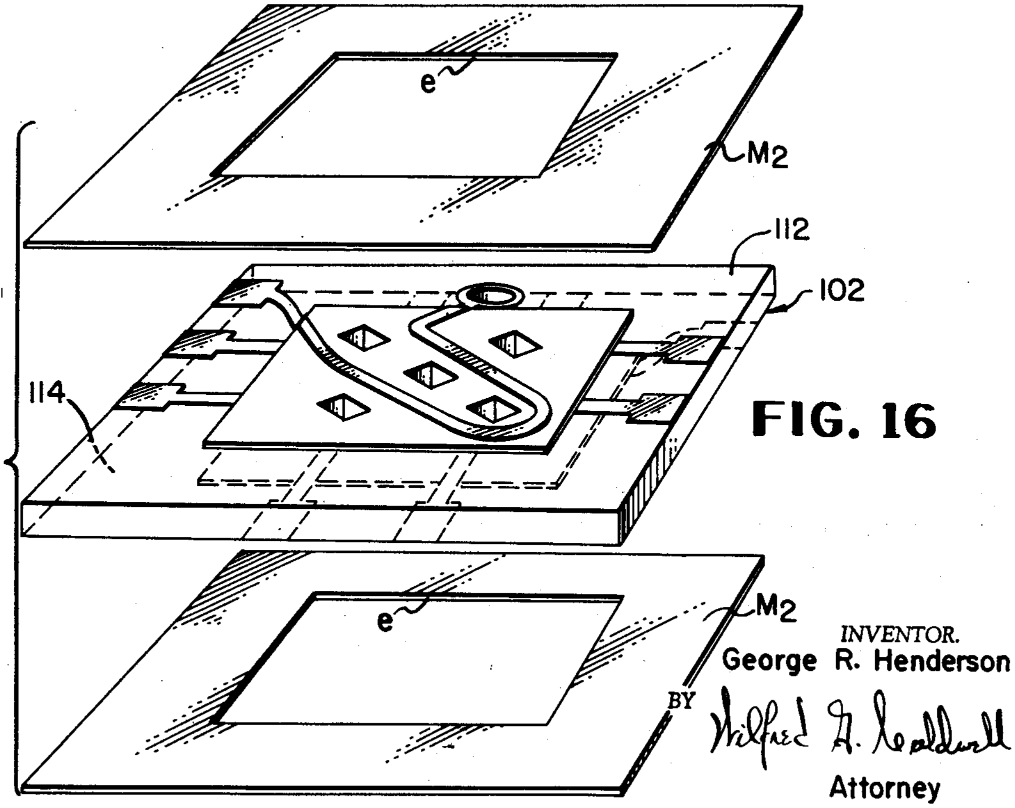
Figure 17:
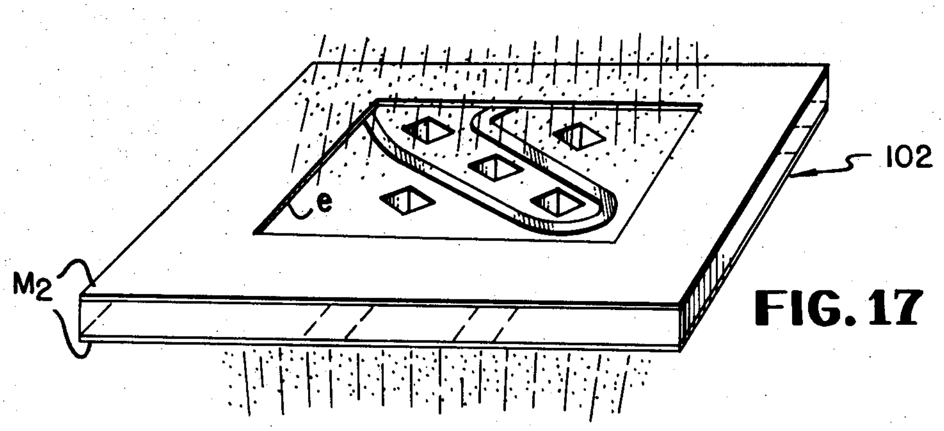
Figures 18, 19:
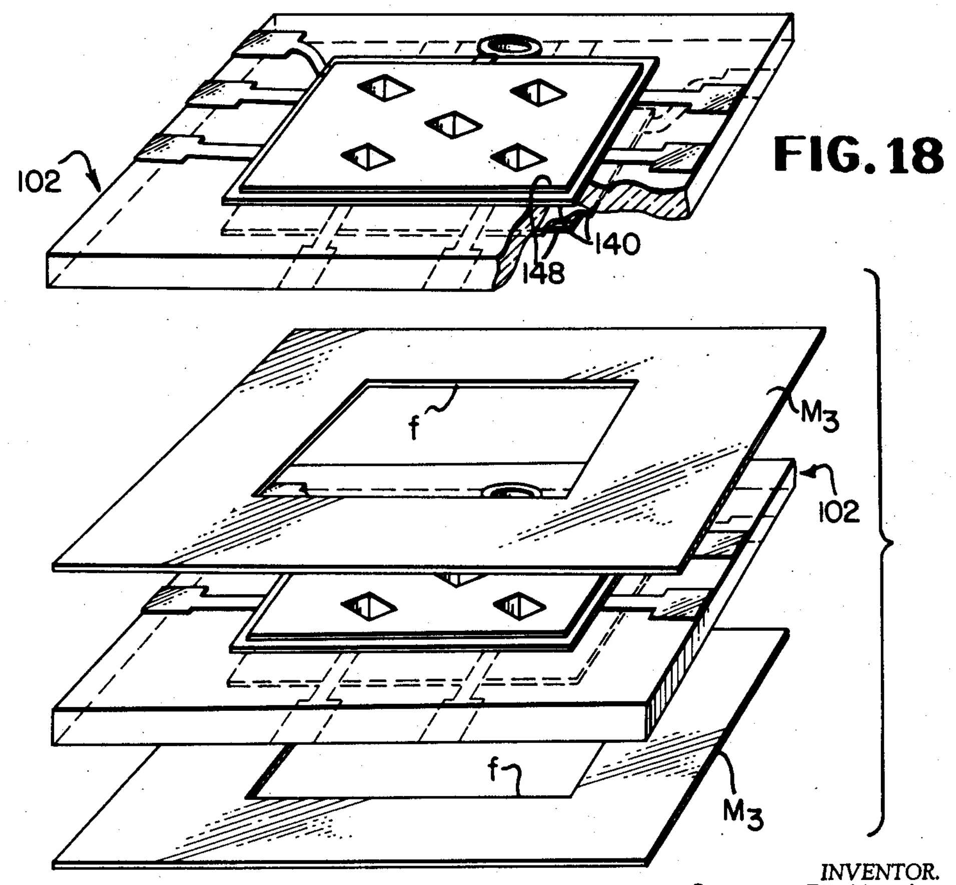
Figures 20, 21, 22, 23:
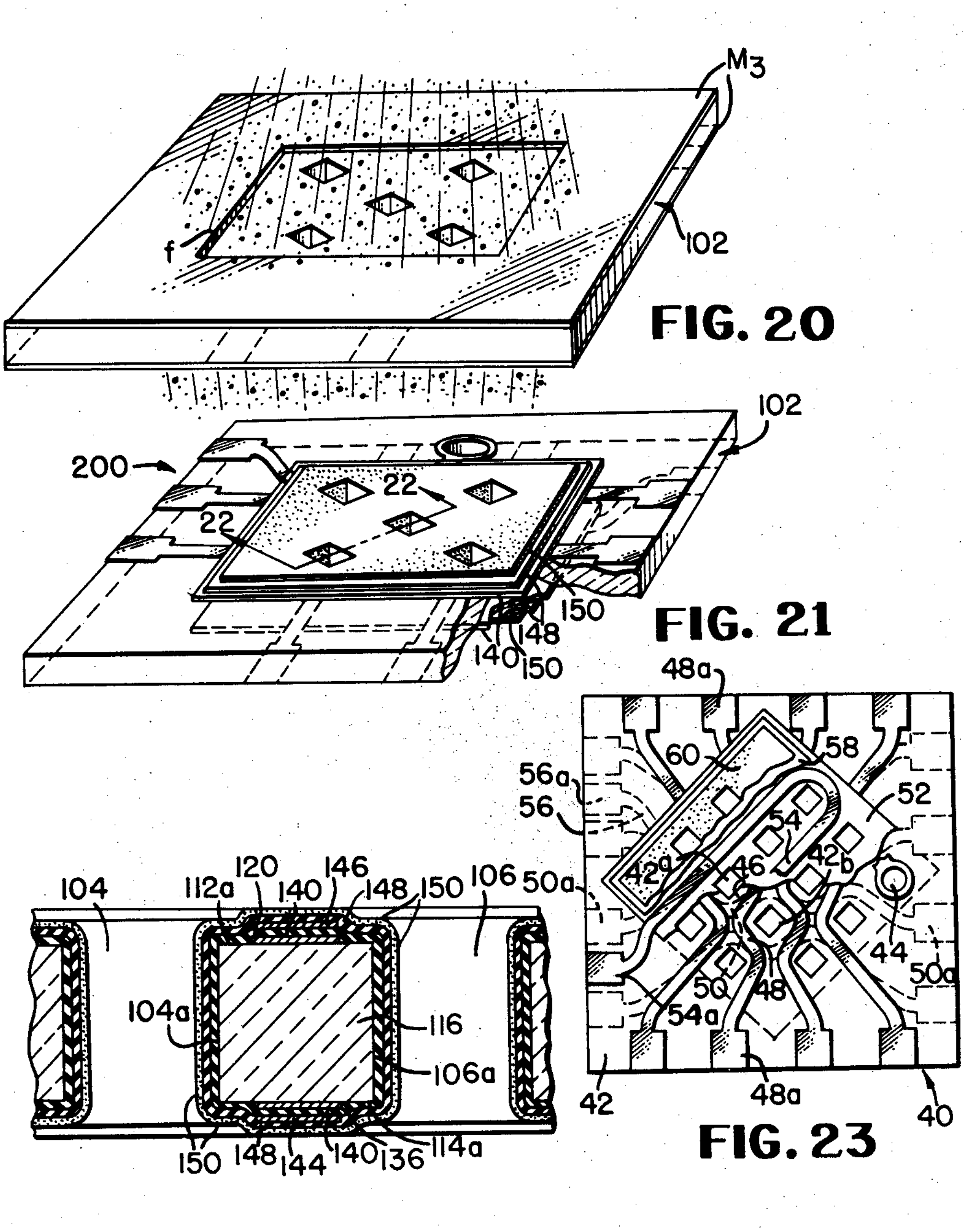

FIGS 1*a*, 2*a–c*, and 3*c* illustrate an alternative way of applying the conductive coating over the substrate sheet by electroplating and photo-engraving methods;

FIG. 1*a* is an exploded view of the assembly of a substrate sheet having successive coatings of copper plate and photosensitive resist material thereover and a mask comprising a negative of the desired coordinate set drive conductor pattern used for photographic exposure of the resist material;

FIG. 2*a* shows the coated substrate sheet and mask in assembled relationship while being exposed to light for hardening the photosensitive resist coating in the desired pattern;

FIG. 2*b* shows the resulting substrate sheet with the remaining copper plate and hardened resist material arranged thereon in the desired pattern after the copper and resist coatings outside the bounds of that pattern have been washed and etched away;

FIG. 2*c* shows the substrate sheet with the copper drive conductors plated thereon immersed in a bath to gold-plate the conductors after the hardened photosensitive resist coating has been dissolved therefrom;

FIG. 3*a* shows the substrate sheet and the finished electroplated, photo-engraved first coordinate set of drive conductors;

FIG. 4 is an exploded view of the assembly of the substrate sheet with the first coordinate set of drive conductors on one face and a mask used for vapor-deposition of a second coordinate set of drive conductors on the opposite face thereof;

FIG. 5 shows the substrate sheet and mask in assembled relationship while being exposed to metallic vapor for plating the second drive conductor set;

FIG. 6 shows the substrate sheet and the finished drive conductor sets;

FIG. 7 is an exploded view of the assembly of the substrate sheet with the drive conductor sets plated thereon and a pair of masks used for applying on both faces thereof an electrically insulating coating;

FIG. 8 shows the drive conductor-coated substrate sheet and spray masks in assembled relationship while being exposed to the insulating spray to form a first insulating coating;

FIG. 9 shows the substrate sheet and the finished insulating coating over the drive conductors, with parts broken away to reveal details of construction;

FIG. 9*a*–9*d* illustrate the succeeding steps in the manufacture of a memory plane having only two sets of conductors plated thereon;

FIG. 9*a* is an exploded view of the assembly of the conductor-and-insulation-coated substrate sheet and a pair of masks used for applying a magnetic alloy thereover;

FIG. 9*b* shows the coated substrate sheet and the alloy deposition masks in assembled relationship while being exposed to the magnetic alloy;

FIG. 9*c* shows the substrate sheet with the drive conductors, the insulating coating, and the finished magnetic alloy coating thereover, parts being broken away to reveal details of construction;

FIG. 9*d* is a section taken along the line **9*d*—9*d*** of FIG. 9*c*;

The remaining figures illustrate the manufacture of an alternative memory plane having sensing conductors in addition to the conductors of the memory plane of FIGS. 9*a*–9*d*;

FIG. 10 is an exploded view of the assembly of the conductor-and insulation-coated substrate sheet of FIG. 9 and a mask used for vapor deposition of a first sensing conductor segment on one face thereof;

FIG. 11 shows the coated substrate sheet and mask in assembled relationship while being exposed to metallic vapor for plating the first sensing conductor segment;

FIG. 12 shows the coated substrate sheet and the finished first sensing conductor segment;

FIG. 13 is an exploded view of the assembly of coated substrate sheet with the first sensing conductor segment thereon and a mask used for vapor-deposition of a second sensing conductor segment on the opposite face thereof;

FIG. 14 shows the coated substrate sheet and the mask in assembled relationship while being exposed to metallic material for depositing the second sensing conductor segment;

FIG. 15 shows the coated substrate sheet with the finished sensing conductor segments;

FIG. 16 is an exploded view of the assembly of the coated substrate sheet with the sensing conductor segments thereon and a pair of masks used for covering both faces thereof with a second insulating coating;

FIG. 17 shows the coated substrate sheet and sensing conductor segments thereon in assembled relationship with the masks while being exposed to a second insulating spray;

FIG. 18 shows the substrate sheet with finished alternate conductive and insulating coatings thereover, parts being broken away to reveal details of construction;

FIG. 19 is an exploded view of the assembly of the alternately conductor-and insulation-coated substrate sheet and a pair of masks used for vapor-deposition of a magnetic alloy thereover;

FIG. 20 shows the alternately coated substrate sheet and the alloy deposition masks in assembled relationship while being exposed to the magnetic alloy vapor;

FIG. 21 shows the finished memory plane including the substrate sheet with the alternate conductive and insulating coatings and the finished magnetic alloy coating thereover, parts being broken away to reveal details of construction;

FIG. 22 is a section taken along the line 22—22 of FIG. 21; and,

FIG. 23 is a top plan view of another memory plane in accordance with the invention somewhat more complex than those of the preceding figures, with parts broken away to illustrate the internal construction thereof.

Referring in detail to the drawings, FIG. 23 shows a typical memory plane, generally designated by the numeral 40, in accordance with article aspects of the present invention. This includes a square perforated substrate sheet 42 molded of an electrically insulating material to serve as a mount for the conductors and other elements of the memory plane which will be described.

The perforations in the substrate sheet 42 include an array of square through apertures **42*a*, 42*b*, etc. grouped in the central region of the substrate sheet and a single round through bore 44 located between the apertures and an edge of the substrate sheet. The apertures 42*a*, 42*b*, etc. are arranged in mutually perpendicular ranks and files, and the substrate material between any two neighboring apertures along the length of any rank and any file forms a rod-like mounting member, for example the mounting member 46 between the apertures 42*a* and 42*b***.

The numerous mounting members thus formed comprise an ordered array in which each individual member defines a particular address and is provided with electromagnetically linked current paths and closed magnetic loop elements to form a memory plane. The desired electromagnetic linking of current paths and closed magnetic loops is achieved by plating conductor strips along the length of the mounting members and a ring of film having the required bistable magnetic remanence characteristics circumferentially about the mounting members and the conductor strips thereon.

Using mounting member 46 as an example, an *x*-coordinate drive conductor strip 48 is plated across the upper face of the substrate sheet 42 and along the length of several mounting members including member 46. A *y*-coordinate drive conductor strip 50 is plated across the lower face of the substrate sheet transversely to the *x*-coordinate drive conductor strip 48. The *y*-coordinate strip 50 runs along the length of several mounting members, only one of which, the mounting member 46, is at the intersection of the *x*- and *y*-coordinate strips 48 and 50 and is thus traversed by both. Each of the intersecting drive conductor strips carries a drive signal between one half and one times the switching current of the magnetic film about the mounting members, and the coincidence of two such signals on a particular pair of intersecting drive conductors such as the strips 48 and 50 is both a desirable and sufficient condition for switching the magnetic film on the particular mounting member at their intersection, e.g. member 46, and no other on the substrate sheet 42.

If desired, sensing conductor strips may also be plated over the substrate sheet 42 and along the mounting members thereof. In order to avoid short-circuiting the drive conductor strips such as strips 48 and 50, an insulating coating 52 on both faces of the substrate sheet 42 covers these strips in the region of the apertures **42*a*, 42*b*, etc., and the sensing conductor strips are plated over the insulating coating 52 in two segments 54 and 56 on the upper and lower faces respectively of the substrate sheet 42 and interconnected through the bore 44. The conductors strips 48, 50, 54 and 56 etc. terminate in enlarged terminal regions 48***a*, 50*a*, 54*a*, and 56*a* etc. respectively which protrude from the region of the insulating coating 52 and are spaced along the edges of the substrate sheet 42 to provide means for ready connection to the conductor strips.

The magnetic film loops are plated over and about the conductor strips in a manner to link electromagnetically therewith. However, in order to prevent the electrically conductive magnetic film alloy from short-circuiting the conductor strips, a second insulating coating 58 covers the sensing conductor segments 54 and 56 on both faces of the substrate sheet and is confined to the region of the apertures 42*a*, 42*b*, etc. in the same manner as the first insulating coating 52 so as not to cover the protruding terminal regions 48*a*, 50*a*, 54*a*, and 56*a* etc.

The magnetic film is in the form of a coating 60 which extends down into the apertures 42*a*, 42*b*, etc. along the side walls thereof and also over both faces of the substrate sheet 42 so as to form closed rings extending circumferentially entirely about the girth of the mounting members such as member 46. The magnetic coating 60 is applied over and confined to the area of the insulating coatings 52 and 58, so as not to make electrical contact with the conductor strips 48, 50, 54, and 56 etc. The current paths defined by these conductor strips running along the length of the mounting members such as member 46 link electromagnetically with the closed rings of magnetic film coated thereabout to provide an array of magnetic remanence devices functioning as a memory plane.

FIGS. 1–22 illustrate a method of manufacturing a memory plane in accordance with this invention and in addition, by demonstrating how the individual elements of such a memory plane are successively formed, clearly illustrate the detailed structure thereof. For the purpose of illustration these figures show the manufacture of simplified memory planes 100 and 200, seen in completed form in FIGS. 9*c* and 21 respectively, which have a minimal number of apertures and mounting members.

Manufacture of either of these memory planes begins with the molding, by any known techniques, of a flat, planar substrate sheet 102, seen in FIG. 1 having five square apertures 104, 105, 106, 107, and 108 clustered in the central region thereof and a circular bore 110 just outside the cluster of apertures. A preferred material for the substrate sheet 42 is glass, plastic, or epoxy plastics. This latter material may be put into a die in paste form and is readily moldable into perforated solid forms. In addition, it has excellent dielectric properties so as to insulate the conductors mounted thereon, and resists both the elevated temperatures required for vapor-deposition of such conductors and the chemical baths required for photo-engraving and electroplating methods.

The openings 104–108 and 110 extend through from the upper face 112 of the substrate sheet 102 to the lower face 114 thereof. The square apertures 104–108 are arranged in a spaced formation of mutually perpendicular columns, the simplified structure of FIGS. 1–22 having only single columns 104, 106, 108 and 105, 106, 107 in each direction. There are pairs of neighboring side walls 104*a*–106*a* and 106*b*–108*b* of the apertures in consecutive order along the length of column 104, 106, 108 and pairs of neighboring side walls 105*c*–106*c* and 106*d*–107*d* of the apertures in consecutive order along the length of column 105, 106, 107. As seen in FIG. 3, the material of the substrate sheet 102 between the neighboring side walls of each such pair forms an array of four mounting members 116, 117, 118, and 119 arranged in mutually perpendicular columns 116, 117 and 118, 119. Each of the mounting members 116–119 is in the form of a rod of square cross-section having opposite ends joined to the remainder of the substrate sheet 102 and a circumferential girth defined by the respective neighboring aperture side walls and the portions of the upper and lower substrate sheet faces therebetween. Specifically, the upper substrate sheet face 112 includes sections 112*a*, 112*b*, 112*c* and 112*d*, seen in FIG. 1, and the lower substrate sheet face 114 includes sections 114*a*, 114*b*, 114*c*, and 114*d*, seen in FIG. 4 which shows the substrate sheet 102 turned over. These upper and lower sections are in registry with each other and located between the pairs of apertures 104–106, 106–108, 105–106, and 106–108 respectively in consecutive order along the length of the mutually perpendicular columns of apertures. Pairs of like-lettered upper and lower substrate sheet face sections form the upper and lower walls respectively of the mounting members 116–119, while the pairs of like-lettered neighboring side surfaces of the consecutive apertures form the side walls of these mounting members. Accordingly, the girth of mounting member 116 is defined by the *a*-lettered walls 104*a*, 112*a*, 106*a*, and 114*a* in that order circumferentially thereabout, while the girths of the remaining mounting members 117–119 are similarly defined by the *b*-lettered, *c*-lettered, and *d*-lettered walls respectively, as will be apparent from the drawings and the reference character scheme employed. The circumferential girth thus defined provides a complete circuit about which the magnetic alloy film can be deposited to form a closed magnetic loop extending circumferentially about a mounting member and about the conductor strips running along the length thereof.

The first operation performed on the substrate sheet 102 is the plating of the conductor strips along the length of mounting members 116–119, the exposed walls 112*a–d* and 114*a–d* thereof being most convenient for this purpose. In order to accomplish this by vapor-deposition methods, a mask $M_1$ is first placed in registry with the substrate sheet as seen in FIG. 1 and, as seen in FIG. 2, is assembled against the upper face 112 thereof while the latter is exposed, in accordance with well-known techniques, to the vapor of any suitable electrically conductive metal such as gold, silver or copper.

The desired drive conductor pattern includes a set of *x*-coordinate conductors traversing respective rows of mounting members extending in one direction and a set of *y*-coordinate conductors traversing respective rows of mounting members extending in a transverse direction to establish a network of intersecting opposite coordinate conductors each intersection of which uniquely defines an address in the mounting member array.

The mask $M_1$ is formed with two openings *a* and *b* shaped to plate respective *x*-coordinate conductor strips 120 and 122 over the upper substrate sheet face 112, as seen in FIG. 3. The strip 120 traverses the mounting member array in a sinuous path to weave between the apertures and along a row of mounting members 116, 119 which extends diagonally to the columns 116, 117 and 118, 119. The diagonal direction permits the strip 120 to traverse a maximum number of mounting members. The strip 120 defines a current path across each individual mounting member which extends from one to the other of the opposite ends thereof joined to the remainder of the substrate sheet 102. This provides a flow of charge along the length of the mounting members so as to link electromagnetically with a loop extending circumferentially about the girth thereof. Since the consecutive mounting members of diagonal rows such as the row 116, 119 are oriented in alternate perpendicular directions, the sinuous path of strip 120 further serves to make the current paths more nearly longitudinal of the individual mounting members. The strip 122 similarly traverses the mounting member array sinuously along the other diagonal row of the remaining mounting members 118, 117 parallel to the row 116, 119 of strip 120. The ends of the strips 120 and 122 extend beyond the array of apertures and mounting members to terminate in enlarged terminal regions 120*a*, 120*b* and 122*a*, 122*b* respectively spaced along a pair of opposite edges of the upper substrate sheet face 112 for ready connection of the drive conductors to signal sources.

As an alternative, the strips 120 and 122 can be formed by electroplating and photo-engraving methods in the manner illustrated in FIGS. 1*a*, 2*a–c*, and 3*a*. As seen in FIG. 10, both faces of the substrate sheet 102, are covered by a coating of copper plate 130 deposited by any known electroplating method. Over the copper plate on both substrate sheet faces there is applied a further coating 132 of any commercially available photosensitive resist material of the type which is attacked readily by an appropriate solvent before being exposed to light, but hardens upon such exposure and becomes relatively resistant to the solvent, thus achieving a photosensitive selective action. Examples of such materials are the type KPR material of the Eastman Kodak Company, type CFC material of the Clerkin Company, and a material known as Hot Top made by the Pitman Company. Solvents used with these preparations include xylol, water, or other substances according to the manufacturer's recommendations. The photosensitive resist material may be applied by dipping, spraying, or roll-coating, the operation being performed under darkroom conditions to prevent premature exposure, and the resist material being maintained at room temperature. The resist coating 132 should be no thicker than two thousandths of an inch, in the interest of hastening subsequent processing and promoting precision results.

A photo-exposure negative N made of glass which is opaque except for transparent areas *c* and *d* having the shape of the conductor strips 120 and 122 is placed in registry with the coated substrate sheet 102 as seen in FIG. 1*a* and assembled against the upper face 112 thereof while the latter is exposed to light as seen in FIG. 2*a*. If, for example, Eastman Kodak type KPR is the photosensitive resist material used, the light source may be a General Electric Company photomicrographic lamp having a rating of 30 amperes at 11 volts positioned approximately 12 inches away, exposure time being of the order of four minutes. As an alternative, a 35 ampere open arc lamp may be used at a distance of approximately four feet for an exposure time of approximately ¾ of a minute. The coated substrate sheet 102 is then bathed in the appropriate solvent, xylol in the case of Eastman KPR, for the length of time necessary to selectively attack the portions of the resist coating 132 which were protected from exposure by the opaque area of negative N while leaving behind portions assuming the desired conductor strip pattern which were hardened by exposure to light through the like-shaped transparent areas *c* and *d*.

Then the resulting copper-clad, partially resist-coated substrate sheet is subjected to a bath of an acid solution which selectively attacks the copper plating 130 but not the hardened remains of the resist coating 132 and the material of the substrate sheet. An example of a typical solution useful for this purpose is:

I

| | cc. |
|---|---|
| Concentrated $HNO_3$ | 250 |
| Concentrated HF | 150 |
| Glacial-acetic acid | 150 |
| Bromide | 3 |

II

| | Volume |
|---|---|
| 3% $H_2O_2$ | 1 |
| Concentrated HF | 1 |
| $H_2O$ | 4 |

III

| | cc. |
|---|---|
| Concentrated $HNO_3$ | 20 |
| Concentrated HF | 40 |
| $H_2O$ containing 2 gr. $AgNo_3$ | 40 |

Since the hardened remains of the resist coating 132 corresponding to opaque negative areas *c* and *d* have the desired conductor strip pattern and are resistant to attack by the copper-attacking acid bath, they serve to protect from attack portions of the copper plating 130 therebelow having that same conductor strip pattern. FIG. 2*b* shows the resulting substrate sheet 102 now stripped of its copper plating 130 and the photosensitive resist coating 132 thereover except for hardened resist-covered strips of copper plating **130*a* and 130*b*** having the shape of the desired respective *x*-coordinate drive conductor strips over the upper face 112.

The next step is to subject the thus partially coated substrate sheet 102 to a second bath of the photosensitive resist solvent, this time for a long enough interval to remove even the light-hardened material remaining over the drive conductor **130*a* and 130*b*. This leaves the substrate sheet 102 plated only with the copper drive conductor strips 130*a* and 130*b*** as seen in FIG. 2*c*. In this figure the conductor strip-coated substrate sheet 102 is shown immersed in a bath for the purpose of plating over the copper drive conductor strips **130*a* and 130*b* with gold. The bath may consist of 200 cc. of the commercially available Baker "Atomex" immersion gold solution in a gallon of water. The pH of the solution should be between 7 and 8, and for plating over copper the temperature is held between 45° and 75° C. The resulting substrate sheet 102** having the finished copper *x*-coordinate drive conductors **130*a* and 130*b* on the upper face 112 thereof and a gold coating 134** over these conductors is seen in FIG. 3*a*.

The resulting x-coordinate drive conductor pattern laid down by either of the described processes provides drive conductors traversing all of the mounting members of the array, the mounting members being organized by the geometry of the arrangement into separate rows associated with respective conductors so that signals can be sent selectively to a particular row. It is then necessary to provide *y*-coordinate conductors arranged to intersect these rows to provide a means of sending a signal selectively to a particular mounting member within the particular row. In order to avoid short-circuiting contact between these intersecting conductors, advantage is taken of the dielectric properties of the substrate sheet material and the *y*-coordinate conductors are plated on the opposite face of the substrate sheet 102 from the *x*-coordinate conductors for electrical insulation therefrom.

Taking the vapor-deposition process and the substrate sheet and conductor strip assembly of FIGS. 1–3 as an example in describing subsequent manufacturing steps, it is seen in FIG. 3 that after the *x*-coordinate drive conductor strips 120 and 122 are formed on the upper face 112 of substrate sheet 102, the latter is turned over 180° about a horizontal axis to expose the opposite face 114. The vapor deposition mask $M_1$ is turned 90° about a vertical axis from its position of FIGS. 1 and 2 and placed in registry with the substrate sheets 102 over the face 114 thereof as seen in FIG. 4. The conductor-forming openings *a* and *b* are then oriented perpendicularly to the *x*-coordinate drive conductor strips 120 and 122 so that the *y*-coordinate drive conductors to be plated therethrough are laid down perpendicularly to the *x*-coordinate drive conductors 120 and 122 to form an address-defining two-coordinate grid system. The mask $M_1$ is then assembled against the substrate sheet face 114 while the latter is exposed to gold, silver, or copper vapor as seen in FIG. 5.

FIG. 6 shows the resulting assembly of the substrate sheet 102 with *y*-coordinate drive conductor strips 136 and 138 corresponding to mask openings *a* and *b* respectively placed over the face 114 thereof. As with the *x*-coordinate strips 120 and 122, for purposes of signal source connection the *y*-coordinate strips 136 and 138 traverse and extend beyond the area of the mounting member array and terminate in enlarged terminal regions **136*a*, 136*b* and 138*a*, 138*b*** respectively at either end of the strips spaced along the other pair of opposite substrate sheet edges. Thus the *x*- and *y*-coordinate terminals are arranged on opposite faces and on transverse pairs of edges of the substrate sheet 102 to facilitate proper connection thereto.

The *y*-coordinate strips 136 and 138 are laid down across the mounting member array in a sinuous pattern along respective parallel, diagonally extending rows of mounting members and traversing the alternately oriented individual mounting members thereof from end to end, just as are the *x*-coordinate strips 120 and 122. The *y*-coordinate strips 136 and 138, however, run along mounting member rows 118, 116 and 117, 119 respectively which are perpendicular to the rows 116, 119 and 118, 117 traversed by the respective *x*-coordinate strips 120 and 122. As a result, although each individual drive conductor strip is associated with a row of mounting members, only one mounting member in that row is at the intersection of any two drive conductor strips of different coordinate sets, and specification of those strips therefore uniquely specifies the address of that particular mounting member and no other in the array.

With the drive conductor strips 120, 122, 136, and 138 plated over both sides 112 and 114 of the substrate sheet 102, further coatings of conductive material laid down thereover to form magnetic rings and additional conductor strips must be separated from the drive conductor strips by interposed layers of electrically insulating material. Such insulating material, however, should not be applied over the *a*- and *b*-lettered terminals of the drive conductor strips 120, 122, 136, and 138, as these must be accessible for connection thereto. The location of these terminals at the edges of the substrate sheet 102 enables them to be protected by appropriate masking from the insulating layer which is to be applied over the remainder of these strips. Accordingly, a pair of identical masks $M_2$ are placed in registry with the drive conductor-coated substrate sheet 102 over the respective faces 112 and 114 thereof as seen in FIG. 7 so that the mask openings expose the central array of apertures 104–108 and mounting members 116–119, but the mask borders cover the *a*- and *b*-lettered terminal regions of drive conductor strips 120, 122, 136, and 138. The masks $M_2$ are then assembled against the substrate sheet faces 112 and 114 while the latter are subjected to a spray, dip, or other application of an electrically insulating material as shown in FIG. 8.

*Details of Spray Material and Spray Process*

FIG. 9 shows the finished insulating coating 140 on both substrate sheet faces covering the drive conductor strips in the region of the central mounting member array but exposing the enlarged terminals at the substrate sheet edges.

While a spray application is described hereinafter, it is particularly within the concept of this invention to utilise dipping or other methods as well as the spray process.

For certain applications in which the conductor strips 120, 122, 136, and 138 are sufficient, all that remains is to deposit the magnetic rings over the insulating coatings 140 and about the mounting member 116–119 and the conductor strips thereon, this step being illustrated in FIGS. 9*a–d*. A pair of film deposition masks $M_3$ are provided which are identical with each other and with the spray masks $M_2$ except that openings therein are slightly smaller than the openings *e* of the spray masks. This assures that the square magnetic film material deposited through the openings *f* is confined to the insulating coatings 140 previously deposited through the openings *e* when the masks $M_3$ are placed in proper registry as seen in FIG. 9*a*. These masks are assembled against the conductor- and insulation-coated faces 112 and 114 of substrate sheet 102 while the entire assembly is exposed, as shown in FIG. 9*b*, to the vapor of any suitable magnetic material having the required square hysteresis loop to produce bistable magnetic remanence characteristics. An example of a material having the required magnetic properties and vapor-deposition capabilities is a nickel-iron alloy in the proportion of about 80%–20%, such as the commercially available material widely known by the trade name "Permalloy." With this material the vapor-deposition process may be carried out in a vacuum of 2 to 3 x 10—5 mm. of mercury. The substrate assembly is mounted on the underside of a heater in the upper part of a vacuum chamber, while the Permalloy source is evaporated therein by resistance or induction heating. Film thickness may be monitored by resistance measurements or by optical means, as is well known. It has been found that an optimum film thickness is about $\frac{1}{1,000}$ of the diameter of the rings.

The rings are formed about the mounting member 116–119 by virtue of the fact that the Permalloy vapor enters the apertures 104–108 and is deposited along the side walls thereof, including the *a*- through *d*-lettered neighboring walls which form the sides of the mounting members 116–119, in addition to being deposited over faces 112 and 114, including the sections **112*a–d* and 114*a–d* thereof which bound the mounting members above and below. Thus, Permalloy coatings 142 are laid down over the finished memory plane 100** of FIG. 9*c* on the insulating coatings 140 over both faces 112 and 114 of substrate sheet 102 and circumferentially about the girth of the mounting members 116–119. Taking mounting member 118 as an example, the sectional view of FIG. 9*c* shows the manner in which the magnetic coating 142 forms closed rings about the mounting members by extending over the complete circuit of walls **105*c*, 112*c*, 106*c* 114*c*, and back to 105*c*. The other mounting members are similarly surrounded by complete rings of the magnetic film 142. Since the magnetic film 142 is applied over the conductors 120, 122, 136, and 138 and the insulating coatings 140** thereover, it is seen that the closed rings of magnetic film about the individual mounting members surround the portions of the conductors traversing those mounting members to link electromagnetically with the current paths defined thereby.

It will be appreciated that in this invention the important aspect of the relationship between a coating and another coating or structural member is their relative position in respect of whether that coating is outside or inside the other coating or member, and that it makes little difference whether the two are in contact or there is a third coating or member interposed therebetween so long as there is no short-circuiting contact between conductors. Accordingly, in this specification and in the appended claims, in order to refer to such relationships broadly it is said that films or coatings are disposed "on, around, about, over, along," etc. a particular surface, where these or similar terms are intended to convey the notion of position without regard to contiguity or lack thereof. Thus, for example, the insulating coating 140 is allowed, as seen in the drawings and particularly in FIG. 9*d*, to cover the aperture side walls such as **105*c* and 106*c*, although it serves no purpose there, simply because it is not convenient to mask the apertures 104–108 during the application of this coating. The magnetic coating 142 may therefore be applied "over" or "along" these surfaces, or words to that effect, whether it is directly in contact therewith or with the interposed insulating coating 140**.

For some applications the drive conductors 120, 122, 136, and 138 so far described are not sufficient, and it is necessary to provide further conductors such as sensing conductors to pick up the read-out output voltage when the drive conductors are energized to switch the magnetic coatings. The remaining figures are concerned with memory planes of this latter type. It is desired to deposit over the substrate sheet 102 a single conductive strip which traverses all the mounting members of the memory plane and thus detects an output when any one of the magnetic rings thereof is switched. One way of doing this is to provide two sensing conductor segments on respective opposite faces of the substrate sheet, these being interconnected through an opening therein, and each traversing a share of the mounting members thereof.

FIG. 10 shows the unfinished conductor- and insulation-coated substrate sheet of FIG. 9 and, in registry therewith, a mask $M_4$ for vapor-deposition of a first sensing conductor segment on the face 114 thereof. The mask $M_4$, which is formed with an opening *g* designed to deposit the segment in the desired pattern, is assembled against the coated face 114 while the latter is exposed to gold, copper, and silver vapor as seen in FIG. 11. The coated substrate sheet 102 with the finished first sensing conductor segment 144 plated over the face 114 thereof is seen in FIG. 12. This segment 144 is in the form of a strip of gold, copper, or silver plated over the insulating coating 140 and traversing the mounting member 118 from end to end, curving about the end of the row of apertures 104, 106, and 108, and traversing the mounting member 119 from end to end. One of the strip 144 runs off the insulating coating 140 onto the surface of the substrate sheet 102 and terminates in an enlarged terminal region **144*a* at an edge thereof other than the two opposed edges along which the terminals 136*a*, 138*a*, 136*b*, and 138*b* on the same face 114 are located. The other end of strip 144 also runs off the insulating coating 140 and terminates at the connecting bore 110**. Because the shape of the opening *g* in mask $M_4$ is such as to expose the bore 110 to the vapor, gold, copper, or silver is deposited along the side walls of that bore to form a plated conductor extending through to the opposite face 112.

In FIG. 13 the substrate sheet 102 is seen after having once again been turned over 180° about a horizontal axis as indicated in FIG. 12 and the mask $M_4$ is in registry therewith after being rotated 180° about a vertical axis, thus keeping the opening *g* thereof in the same relation to the connecting bore 110. The mask $M_4$ is then assembled against the face 112 while the latter is exposed to gold, copper, or silver vapor as seen in FIG. 14. The resulting second sensing conductor segment 146 plated over the face 112 is seen in FIG. 15. This segment is identical with the segment 144 on the opposite face 114 and is interconnected therewith through the connecting bore 110 to form a single continuous sensing conductor therewith. The second segment 146, however, traverses the remaining mounting members 116, and 117, thus enabling the continuous sensing conductor to pick up an output from any mounting member in the array. The segment 146 terminates in an enlarged terminal region **146*a* located along the same substrate sheet edge as terminals 120*a* and 122*a* on the same face 112** but spaced therefrom for insulation purposes.

The presence of the sensing conductor segments 144 and 146 over the insulation coatings 140 in the region of the apertures 104–108 necessitates a second insulation coating thereover to provide a base for the deposition of a magnetic coating which will surround all the conductors 120, 122, 136, 138, 144, and 146 now traversing the mounting member array. Therefore the spray masks $M_2$ are once again placed in registry with the coated substrate sheet 102 as seen in FIG. 16 and assembled against the faces 112 and 114 thereof as seen in FIG. 17 while the latter are subjected to an insulating spray as previously described in connection with the insulating coatings 140. Once again, the openings *e* in masks $M_2$ serve to confine the insulating material to the central area of the apertures 104–108, so as to leave the terminals along the edges of the substrate sheet 102 exposed to electrical contact. The finished outer insulating coatings 148 are seen in FIG. 18.

Masks $M_3$, seen in registry with the alternately conductor- and insulation-coated substrate sheet 102 in FIG. 19, are used for vapor-deposition of the magnetic coating surrounding all the conductors of this memory plane embodiment in the same manner as previously described in connection with the magnetic coating 142 of the memory plane 100. In FIG. 20 the masks $M_3$ are seen assembled against the multiply coated substrate sheet faces 112 and 114 while the latter are exposed to Permalloy vapor under the conditions previously described. The openings *f* in masks $M_3$, as was noted, are slightly smaller than the openings *e* of masks $M_2$ so as to assure that the magnetic coatings deposited therethrough over the faces 112 and 114 are confined to the area of the insulating coatings 140 and 148 and do not make electrical contact with the conductors protruding therefrom.

The completed memory plane 200 including both drive and sensing conductors and having the finished magnetic coating 150 surrounding all such conductors is seen in FIG. 21. It may be readily appreciated from the sectional view of FIG. 22 that, taking mounting member 16 as an example, the magnetic coating 150 extends about the complete circuit of walls **104*a*, 112*a*, 106*a*, 114*a*, and back to 104*a* in order to form a closed magnetic ring surrounding the conductors 120, 136, 144, and 146 electromagnetically linking with the current paths defined thereby. The remaining mounting members and the respective conductors thereon are similarly surrounded by closed rings of the magnetic coating 150. The more complex memory plane 40 of FIG. 23 is similar in all respects to the memory plane 200** and is constructed by exactly the same methods, the conductor strips thereof following the same general plan for weaving between the apertures to traverse the more numerous mounting members required in a commercial embodiment.

It will now be appreciated that a memory plane having any desired number of addresses and any desired number of driving, sensing, or other types of conductors can be easily and inexpensively constructed in accordance with this invention by means of printed circuit mass production techniques. Such a memory plane, moreover, will provide superior performance by virtue of the fact that the magnetic remanence element is a closed ring of thin film magnetic material simultaneously and integrally formed to avoid the unrepeatable gaps which affected the performance of previous devices.

It has been found highly desirable to plate Permalloy or a nickel-iron alloy in the range of 15 to 25% iron and 85 to 75% nickel with masks $M_3$ in position as shown in FIG. 9*b* to achieve very satisfactory results.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A magnetic remanence device comprising a mounting member in the form of a substrate sheet of electrically insulating material with a plurality of through apertures extending between opposed faces thereof, an electrically conductive coating over said mounting member arranged to define a current path therealong, and a magnetic coating extending circumferentially about said mounting member and surrounding said current path for electromagnetic linking therewith.

2. A magnetic remanence device comprising a mounting member in the form of a substrate sheet of electrically insulating material with a plurality of through apertures extending between opposed faces thereof, electrically conductive coatings over said mounting member arranged to define current paths therealong, a coating of electrically insulating material over said conductive coatings, and a magnetic coating extending circumferentially about said mounting member and surrounding said current paths for electromagnetic linking therewith.

3. A memory plane comprising a substrate sheet formed with a plurality of through apertures extending between opposite faces thereof, and being so arranged and spaced from each other that the portions of said substrate sheet between respective neighboring side walls thereof form an array of mounting members each having opposite ends joined to the remainder of said substrate sheet and a circumferential girth defined by said opposite substrate sheet faces and said neighboring aperture side walls, electrically conductive means traversing said mounting members in a manner to define current paths extending from one of said opposite ends thereof to the other, and a magnetic coating surrounding the assemblies of said mounting members and said conducting means and extending along said opposite substrate sheet faces and said neighboring aperture side walls about the girth of individual mounting members for electromagnetic linking with said current paths.

4. A memory plane comprising a substrate sheet of electrically insulating material formed with a plurality of through apertures extending between opposite faces thereof, said apertures having side walls and being so arranged and spaced from each other that the portions of said substrate sheet between respective neighboring side walls thereof form an array of mounting members each having opposite ends joined to the remainder of said substrate sheet and a circumferential girth defined by said opposite substrate sheet faces and said neighboring aperture side walls, alternate electrically conductive and electrically insulating coatings over said substrate sheet arranged to form a plurality of conductor strips, covered over by said insulating coatings, said conductor strips traversing said mounting members in a manner to define current paths extending from one of said opposite ends thereof to the other, and a magnetic coating surrounding the assemblies of said mounting members and said conducting and insulating coating and extending along said opposite substrate sheet faces and said neighboring aperture side walls about the girth of individual mounting members for electromagnetic linking with said current paths.

5. A memory plane comprising a substrate sheet of electrically insulating material formed with a plurality of through apertures extending between opposite faces thereof, said apertures having side walls and being so arranged and spaced from each other that the portions of said substrate sheet between respective neighboring side walls thereof form an array of mounting members each having opposite ends joined to the remainder of said substrate sheet and a circumferential girth defined by said opposite substrate sheet faces and said neighboring aperture side walls, alternate electrically conductive and electrically insulating coatings over said substrate sheet arranged to form a plurality of conductor strips covered over by said insulating coatings, said conductor strips traversing said mounting member array in a manner to define respective current paths extending along respective rows of mounting members, the mounting members of respective rows being traversed by said current paths from one of said opposite ends thereof to the other, said conductor strips being arranged in coordinate groups located on said opposite substrate sheet faces for electrical insulation from each other, the respective directions of traverse of said conductor strips being parallel within each coordinate group and mutually transverse between said coordinate groups so that each crossing of any conductor strips of different coordinate groups uniquely defines an address in said mounting member array, and a magnetic coating surrounding the assemblies of said mounting members and said conducting and insulating coating and extending along said opposite substrate sheet faces and said neighboring aperture side walls about the girth of individual mounting members for electromagnetic linking with said current paths.

6. A memory plane comprising a substrate sheet of electrically insulating material formed with a plurality of through apertures extending between opposite faces thereof, said apertures having side walls and being so arranged and spaced from each other that the portions of said substrate sheet between respective neighboring side walls thereof form an array of mounting members arranged in mutually transverse columns and each having opposite ends joined to the remainder of said substrate sheet and a circumferential girth defined by said opposite substrate sheet faces and said neighboring aperture side walls, alternate electrically conductive and electrically insulating coatings over said substrate sheet arranged to form a plurality of conductor strips covered over by said insulating coatings, said conductor strips traversing said mounting member array in a manner to define respective current paths extending along respective rows of mounting members transverse to said columns thereof, the mounting members of respective rows being traversed by said current paths from one of said opposite ends thereof to the other, said conductor strips being arranged in coordinate groups located on said opposite substrate sheet faces for electrical insulation from each other, the respective directions of traverse of said conductor strips being parallel within each coordinate group and mutually transverse between said coordinate groups so that each crossing of any conductor strips of different coordinate groups uniquely defines an address in said mounting member array, and a magnetic coating surrounding the assemblies of said mounting members and said conducting and insulating coating and extending along said opposite substrate sheet faces and said neighboring aperture side walls about the girth of individual mounting members for electromagnetic linking with said current paths.

7. A memory plane comprising a substrate sheet of electrically insulating material formed with a plurality of through openings extending between opposite faces thereof including a group of apertures and a connecting bore each having side walls, said apertures being so arranged and spaced from each other that the portions of said substrate sheet between respective neighboring side walls thereof form an array of mounting members each having opposite ends joined to the remainder of said substrate sheet and a circumferential girth defined by said opposite substrate sheet faces and said neighboring aperture side walls, alternate electrically conductive and electrically insulating coatings over said substrate sheet arranged to form a conductor strip covered over by said insulating coatings, said conductor strip traversing said mounting members in a manner to define current paths extending from one of said opposite ends thereof to the other and including segments on said opposite substrate sheet faces interconnected along said connecting bore side walls and each traversing a share of said conductor strip traversing said mounting members in a manner to define current paths extending from one of said opposite ends thereof to the other and including segments on said opposite substrate sheet faces interconnected along said connecting bore side walls and each traversing a share of said mounting members and a magnetic coating surrounding the assemblies of said mounting members and said conducting and insulating coating and extending along said opposite substrate sheet faces and said neighboring aperture side walls about the girth of individual mounting members for electromagnetic linking with said current paths.

8. A memory plane comprising a substrate sheet of electrically insulating material formed with a plurality of through apertures extending between opposite faces thereof, said apertures having side walls and being so arranged and spaced from each other that the portions of said substrate sheet between respective neighboring side walls thereof form an array of mounting members each having opposite ends joined to the remainder of said substrate sheet and a circumferential girth defined by said opposite substrate sheet faces and said neighboring aperture side walls, alternately electrically conductive and electrically insulating coatings over said substrate sheet arranged to form a plurality of sets of conductor strips arranged in overlying relationship and interleaved with and covered over by said insulating coatings, said conductor strips traversing said mounting members in a manner to define current paths extending from one of said opposite ends thereof to the other, and a magnetic coating surrounding the assemblies of said mounting members and said conducting and insulating coating and extending along said opposite substrate sheet faces and said neighboring aperture side walls about the girth of individual mounting members for electromagnetic linking with said current paths.

9. A memory plane comprising a substrate sheet of electrically insulating material formed with a plurality of through openings extending between opposite faces thereof including a group of apertures and a connecting bore each having side walls, said apertures being so arranged and spaced from each other that the portions of said substrate sheet between respective neighboring side walls thereof form an array of mounting members arranged in mutually transverse columns and each having opposite ends joined to the remainder of said substrate sheet and a circumferential girth defined by said opposite substrate sheet faces and said neighboring aperture side walls, alternate electrically conductive and electrically insulating coatings over said substrate sheet arranged to form a plurality of sets of conductor strips arranged in overlying relationship and interleaved with and covered over by said insulating coatings, said sets including a set of first conductor strips and at least one further conductor strip set, said first conductor strips traversing said mounting member array in a manner to define respective current paths extending along respective rows of mounting members transverse to said columns thereof, the mounting members of respective rows being traversed by said current paths from one of said opposite ends thereof to the other, said first conductor strips being arranged in coordinate groups located on said opposite substrate sheet faces for electrical insulation from each other, the respective directions of traverse of said first conductor strips being parallel within each coordinate group and mutually transverse between said coordinate groups so that each crossing of any first conductor strips of different coordinate groups uniquely defines an address in said mounting member array, said further conductor strip set including a second conductor strip traversing said mounting members in a manner to define current paths extending from one of said opposite ends thereof to the other and including segments on said opposite substrate sheet faces interconnected along said connecting bore side walls and each traversing a share of said mounting members, and a magnetic coating surrounding the assemblies of said mounting members and said conducting and insulating coating and extending along said opposite substrate sheet faces and said neighboring aperture side walls about the girth of individual mounting members for electromagnetic linking with said current paths.

References Cited in the file of this patent

UNITED STATES PATENTS

| | | |
|---|---|---|
| 1,287,982 | Hartley | Dec. 17, 1918 |
| 2,187,115 | Elwood et al. | Jan. 16, 1940 |
| 2,671,950 | Sukacev | Mar. 16, 1954 |
| 2,820,216 | Gottrup | Jan. 14, 1958 |
| 2,877,540 | Austen | Mar. 17, 1959 |
| 2,878,463 | Austen | Mar. 17, 1959 |
| 2,882,519 | Walentine et al. | Apr. 14, 1959 |
| 2,911,627 | Kilburn et al. | Nov. 3, 1959 |
| 2,998,840 | Davis | Sept. 5, 1961 |
| 3,071,755 | Howard | Jan. 1, 1963 |